United States Patent [19]

Hildebrand et al.

[11] Patent Number: 5,539,633
[45] Date of Patent: Jul. 23, 1996

[54] TEMPERATURE CONTROL METHOD AND APPARATUS

[75] Inventors: Paul N. Hildebrand, Tulsa; Ronald E. Briggs; T. Frank Knight, both of Owasso, all of Okla.; Manjiree Jalukar, Troy, Mich.; Ralph Dietz, Owasso; Kelley A. Lawrence, Tulsa, both of Okla.

[73] Assignee: Excel Energy Technologies, Ltd., Tulsa, Okla.

[21] Appl. No.: 353,535

[22] Filed: Dec. 9, 1994

[51] Int. Cl.⁶ .................................................. G05B 13/02
[52] U.S. Cl. ........................................ 364/152; 364/185
[58] Field of Search .................................. 364/152, 184, 364/185, 153, 154, 155, 156, 157

[56] References Cited

U.S. PATENT DOCUMENTS 5,361,982  11/1994  Liebl et al. ........................ 236/46 R
5,361,983  11/1994  Bird ................................. 236/46 R

FOREIGN PATENT DOCUMENTS 9406191  3/1994  WIPO.

*Primary Examiner*—Roy N. Envall, Jr.
*Assistant Examiner*—Karen D. Presley
*Attorney, Agent, or Firm*—Dougherty, Hessin, Beavers & Gilbert

[57] ABSTRACT

Power demand is monitored and temperature control effected in response. If monitored power demand is below a predetermined power demand limit, a selected desired temperature setpoint is used as the temperature to be attained. If monitored power demand is above the power demand limit, a modified temperature setpoint is used. The modified temperature setpoint preferably is determined to maintain a still comfortable temperature while also reducing power demand.

14 Claims, 3 Drawing Sheets

TEMPERATURE CONTROL METHOD AND APPARATUS

BACKGROUND OF THE INVENTION

This invention relates generally to temperature control methods and apparatus. This invention relates more particularly to a method and apparatus which allow a controlled temperature to drift up (if the air is being cooled) or down (if the air is being heated) within a predetermined tolerance if a monitored power demand exceeds a predetermined level.

Energy management is critical for environmentally conscious, cost-effective operation of buildings where heating, ventilating and air conditioning (HVAC) are used. Whereas in the past some types of energy management controls have been relatively static (e.g., a residential thermostat set at one desired temperature to be maintained throughout the day in a home), now there are dynamic energy management apparatus that can control HVAC equipment on a highly variable schedule. To enhance the operation of these dynamic apparatus, there is the need for such apparatus to be able to respond to power demand exceeding a predetermined limit by appropriately controlling the HVAC equipment.

By way of an example, it would be desirable if an energy management apparatus that controls HVAC equipment at a commercial building could automatically adjust its control of the equipment when the energy management apparatus detects that the HVAC equipment power demand exceeds a predetermined power demand limit. With this capability the local demand could be limited to avoid a higher "capacity charge."

As another example, an electric utility company that serves thousands of customers may want to send a control signal to one or more of its customers to reduce their respective power demand when the electric utility experiences a peak incidental load condition. With this capability the possibly more drastic action of "load shedding" could be reduced.

Electric utilities can provide a residential customer with a local radio frequency receiver and a drum type ratchet timer for duty cycling the customer's air conditioning compressor. When the timers that have been provided to customers are to be activated (typically based on peak incidental or scheduling for demand limiting), the electric utility transmits the appropriate radio frequency signal. For example, such an activating signal may be sent at 2:00 pm and a deactivating signal may be sent at 8:00 pm. During such an activation period, compressors could cycle "on" for fifteen minutes (for example) if otherwise called for by their respective thermostats, then "off" for fifteen minutes (for example) regardless of what their local systems do. This is a simple means of limiting the utility's summer electrical demand. A disadvantage of this system is that it simply provides an "on" or "off" signal; it functions regardless of what the desired temperature setpoint (e.g., thermostat setting) may be or what the actual controlled temperature becomes. Thus, the activated drum timer cycles on and off the same regardless of ambient conditions; therefore, during days of high outside temperatures, residential home temperatures could rise to uncomfortable levels. For example, during a one hour period while the drum timer is active, the air conditioning compressor runs for at most a cumulative time of 30 minutes and is off for at least a cumulative time of 30 minutes under the foregoing example of fifteen minute duty cycling. With hot outside temperatures and possibly low insulation values in a home, however, it may have been necessary to run the air conditioning compressor for forty-five minutes during the one hour to maintain a comfortable indoor temperature (i.e., if the compressor had not been disabled, the home thermostat would have called for the compressor to run forty-five minutes). If improved control were provided, however, possibly more efficient control could be realized so that both reduced energy load and more reasonable comfort could be obtained.

Thus, there is the need for a temperature control method and apparatus by which both reduced power demand and comfortable temperatures can be simultaneously obtained in response to power demand exceeding a predetermined limit.

SUMMARY OF THE INVENTION

The present invention overcomes the above-noted and other shortcomings of the prior art by providing a novel and improved temperature control method and apparatus. By the method and apparatus, power demand is monitored and temperature control is effected in response. Specifically, if monitored power demand is below a predetermined power demand limit, a selected desired temperature setpoint is used as the temperature to be attained; if monitored power demand is above the power demand limit, a modified temperature setpoint is used, which modified temperature setpoint preferably is determined to maintain a still comfortable temperature while also reducing power demand. This can be obtained by either or both of two aspects of the present invention.

In one aspect, the power demand limiting is a local energy management function that monitors real time power demand at the field site where the HVAC equipment is located and compares this value with a predetermined power demand setpoint. If the setpoint is exceeded, then equations within the local monitor and control apparatus are used to allow zonal temperature setpoints to be modified by the energy management apparatus in an effort to reduce the demand below the predetermined power demand limit. In the preferred embodiment, this local power demand limiting uses tolerances and priorities. If the location served by the controlled HVAC equipment has one or more zones where temperature is to be maintained with zero tolerance, then such zone(s) will have a high priority and the desired temperature setpoint will not be altered in the event of power demand limiting activation. Other zones, however, may have a tolerance value of five or ten, for example, which will allow temperature setpoints for these zones to be changed to values defined by a tolerance table in the preferred embodiment.

The other aspect relates to a remote entity, such as an electric utility, monitoring its system to determine if a system power demand limit setpoint is exceeded. If a setpoint is exceeded, the remote entity broadcasts one or more alarm signals in response to which alarm codes are generated to allow a local energy management apparatus to change temperatures to values possibly different from values contained in the aforementioned demand limiting tolerance table. These values are changed, according to a demand side management table which is within the local energy management apparatus but which is different from the tolerance table used in the locally initiated power demand limiting function, for a specific time duration and are independent of the on site power demand measurement taken by the local apparatus.

An advantage of the present invention is that improved comfort and control can be obtained by property management personnel. Increased efficiency can be obtained by allowing temperature variations within certain building areas which are typically occupied only under incidental circumstances (e.g., hallways). Zonal temperatures can be adjusted with regard to unusual circumstances (e.g., areas that have high heat gain due to summer solar load).

The temperature control method of the present invention comprises: controlling a temperature modification device to provide a temperature in response to a desired temperature setpoint; and changing the control of the temperature modification device in response to a predetermined power demand limit being exceeded. The step of changing the control includes controlling the temperature modification device to provide a temperature in response to a modified temperature setpoint, wherein the modified temperature setpoint is obtained by changing the desired temperature setpoint within a predetermined value of the desired temperature setpoint so that power demand is reduced in obtaining temperature in response to the modified temperature setpoint.

Changing the control of the temperature modification device includes monitoring power demand where the temperature is controlled and changing the control in response to the monitored power demand exceeding the predetermined power demand limit.

Changing the control of the temperature modification device can further or alternatively include monitoring power demand at an electric utility, for example, remote from where the temperature is controlled and changing the control in response to a remote control signal sent from the electric utility to signify that the monitored power demand at the electric utility has exceeded the predetermined power demand limit.

The temperature control apparatus of the present invention comprises means for storing a desired temperature setpoint, a power demand limit setpoint and a temperature setpoint tolerance; means for comparing a sensed power demand with a stored power demand limit setpoint; and means for sensing a temperature. The apparatus further comprises means for providing a control signal to a temperature modification device in response to whether the compared sensed power demand is less than or greater than the stored power demand limit setpoint. This last means includes: means, responsive both to the compared sensed power demand being less than the stored power demand limit setpoint and to the sensed temperature, for generating the control signal to cause the temperature modification device to make the sensed temperature equal to a stored desired temperature setpoint; and means, responsive both to the compared sensed power demand being greater than the stored power demand limit setpoint and to the sensed temperature, for generating the control signal to cause the temperature modification device to make the sensed temperature equal to the stored desired temperature setpoint plus or minus a predetermined incremental deviation therefrom within a stored temperature setpoint tolerance.

Therefore, from the foregoing, it is a general object of the present invention to provide a novel and improved temperature control method and apparatus. Other and further objects, features and advantages of the present invention will be readily apparent to those skilled in the art when the following description of the preferred embodiments is read in conjunction with the accompanying drawings.

DETAILED DESCRIPTION OF PREFERRED EMBODIMENTS

The following copending United States patent applications are incorporated herein by reference: U.S. patent application Ser. No. 08/349,180 filed Dec. 2, 1994 and entitled "Energy Utilization Controller and Control System and Method," and U.S. patent application Ser. No. 08/353,536 filed concurrently herewith and entitled "Method of Anticipating Potential HVAC Failure."

Figure 1:
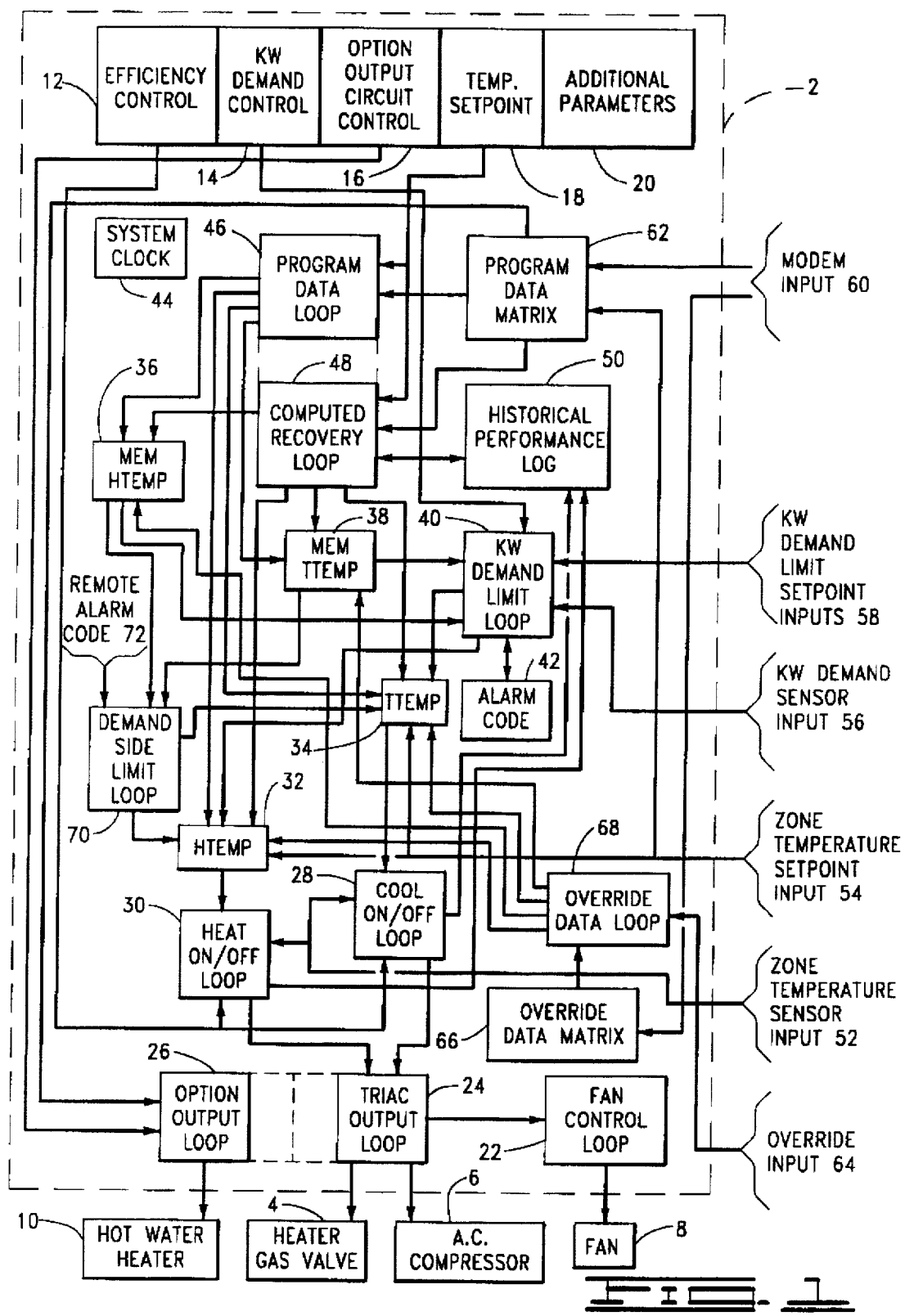
FIG. 1 is a block diagram, including a functional flow chart, of the apparatus and method of the preferred embodiment of the present invention.

FIG. 1 shows a temperature control apparatus 2 connected to HVAC equipment including a heater gas valve 4, an air conditioner compressor 6 and an associated fan 8. Also depicted is a hot water heater 10.

A specific implementation of the preferred embodiment of the apparatus 2 is the microcomputer-based XLT-8000 energy management system from Excel Energy Technologies, Ltd. programmed in accordance with the functional flow chart set forth in FIG. 1. The hardware and software/firmware of this implementation define specific embodiments of the various means and steps described below. The hardware includes conventional components such as a microprocessor connected to a timing circuit, a memory (typically comprising various elements such as a read only memory and random access memory), a display, and a data entry device (e.g., a keypad). The memory stores the software/firmware and provides working space and storage space for various registers as needed. The apparatus 2 is preferably housed in a single housing so that all the relevant elements are maintained together at the site where temperature control is effected.

The software/firmware particularly relevant to the present invention programs the hardware to implement the means and functions represented in FIG. 1.

The elements 4, 6, 8, 10 can be referred to as temperature modification devices, and they can be implemented with any suitable equipment known in the art. These elements interface with and operate in response to the apparatus 2 in conventional manner.

Functional Flow Diagram of FIG. 1

The following briefly explains the various functional blocks shown in FIG. 1. Further explanation will be given below with reference to FIGS. 2 and 3.

Remote Control Inputs

Efficiency control, kw demand control, option output circuit control, temperature setpoint, and additional parameter signals can be provided to the apparatus 2 via remote control, such as preferably through a pager network described in a copending application entitled "ENERGY UTILIZATION CONTROLLER AND CONTROL SYSTEM AND METHOD" incorporated herein by reference.

Efficiency Control Input 12

In the preferred embodiment, an efficiency control signal provided to the apparatus 2 comes in a respective form to command: 1) off, 2) low efficiency, or 3) high efficiency.

Efficiency control is a methodology whereby the fan 8 is allowed to run while the outputs for the heater gas valve 4 or the air conditioner compressor 6 (depending on the heating/cooling mode selected) are toggled on and off. If the efficiency control signal is off, then the apparatus 2 allows the air conditioner or heater and the fan to run in a simultaneous mode as a controlling thermostat is dissatisfied. If the high efficiency mode is engaged, the apparatus 2 allows the fan to run while the thermostat is dissatisfied but the air conditioner or heater is toggled off and on more frequently than the low efficiency mode. In low efficiency mode, the fan is run continuously while the thermostat is unsatisfied and the air conditioner or heater is toggled off and on less frequently than during the high efficiency mode. Different heat on/heat off and cool on/cool off cycles can be used for different temperature ranges or different temperature deviations within each efficiency level. Continued running of the fan takes advantage of latent heating or cooling that is still in the duct system.

Kilowatt (kw) Demand Control Input 14

The kilowatt demand control provides for the following signal inputs so that parameters can be changed from a remote site: 1) off, 2) kilowatt demand limit, 3) down kilowatt demand limit and 4) tolerance values on a per zone basis.

Option Output Circuit Control Input 16

The option output circuit control provides an input by which signals can be communicated to the apparatus 2 either through a modem or a paging data receiver to activate an option control circuit identified in FIG. 1 as option output loop 26 subsequently described.

Temperature Setpoint Input 18

The temperature setpoint can be modified via phone modem or paging data receiver. These values are used in determining TTEMP and HTEMP (described below) for desired temperature setpoints.

Additional Parameter Inputs 20

Additional parameters that the energy management apparatus 2 may use are described in the patent application entitled "ENERGY UTILIZATION CONTROLLER AND CONTROL SYSTEM AND METHOD," which is incorporated herein by reference. These do not form part of the present invention unless further described herein.

The following explains the remaining blocks of FIG. 1.

Fan Control Loop 22

This portion enables relays that run the fan 8. This loop is tied in through a triac output loop 24 (described below) and ensures that if the heater or the air conditioner is enabled, the fan 8 is also enabled whether the fan was programmed to be enabled or not. This is a safety feature to ensure that the control unit 2 is not running an air conditioner compressor or a heater without circulating air.

If the control unit's fan switch is on, the fan control loop 22 ensures that the fan output is enabled.

Triac Output Loop 24

The triac output loop 24 examines the logical output settings for the fan, heater and air conditioner based on the routine that enables the heater and air conditioner. The cycling of the end devices is handled in another routine. Triac output loop 24 transfers the logical on/off signal for the heater gas valve 4 or the air conditioner compressor 6 to a respective on/off relay.

Option Output Loop 26

Option output loop 26 and triac output loop 24 are basically identical. Option output loop 26 is a sub-section of the triac output loop 24, but it does not deal with the HVAC equipment. It enables or disables other electrical items (e.g., the hot water tank 10, lights, air compressors, etc.).

Cool On/Off Loop 28 and Heat On/Off Loop 30

Cool on/off loop 28 and heat on/off loop 30 function almost identically. The basic function of the cool on/off loop 28 is to test if the desired temperature TTEMP is lower than the ambient temperature in a respective zone. If true, then the air conditioning and fan equipment are enabled. When the desired temperature is achieved in the zone, this cooling equipment is disabled. A safety feature turns off the heating equipment to ensure that it is not running at the same time as the air conditioning equipment. An additional safety feature ensures that the air conditioner, once off, will not be enabled for five minutes to prevent slugging; and the heat is not run for less than thirty seconds to prevent condensation build-up. The heater on/off routine works such that as the zone temperature is tested and measured below the desired temperature setpoint HTEMP, this activates the heater equipment. The inverse is true for turning the heater off. These routines respond to the efficiency control 12 described above.

HTEMP 32 and TTEMP 34

HTEMP 32 is the desired temperature on a per-zone basis for the heat setpoint. TTEMP 34 is the desired temperature on a perzone basis for the air conditioner setpoint. These can be referred to as the "working" or "applied" setpoints because they can be changed, in accordance with the present invention, from the actual selected setpoints as explained below. In the preferred embodiment there is a minimum three degree differential between HTEMP and TTEMP to prevent the heater or air conditioner from being turned on when the other is on. The dominant temperature, the one that controls which way the three degree slide goes, is based on the current operating mode, either heat or cool. If the unit is in the heat mode, HTEMP is the dominant temperature and TTEMP, unless it already meets this criterion, is adjusted internally so that it is a minimum of three degrees greater than HTEMP, then it is left alone. If in cool mode, TTEMP is the dominant temperature and HTEMP is lowered (if needed) to be a minimum three degrees below TTEMP. Program modules do not directly turn on or off the air conditioner or heater, these modules modify HTEMP and TTEMP so that the cool on/cool off or heater on/heater off routines perform all the necessary changes. This way safety features are never bypassed.

MEMHTEMP 36 and MEMTTEMP 38

The coefficients MEMHTEMP 36 and MEMTTEMP 38 are temporary storage registers which reflect HTEMP and TTEMP except that these registers store values representing the currently programmed desired settings. After a modification such as demand limiting or another routine has completed its task, then the control system returns to these base line temperatures.

Kw Demand Limit Loop 40

Kw demand limit module 40 uses predetermined kw demand limit setpoints and a kw demand sensor input to perform calculations to determine whether to adjust the current desired temperatures. The user establishes limits to the amount of energy used at a given time. There are two limit settings that the user must enter: kilowatt demand limit setpoint and down kilowatt demand limit setpoint. The kilowatt demand limit setpoint is a limit that activates desired temperature value adjustments when the setpoint is exceeded. If a site draws more kilowatts for a given period, then the demand limiting feature is enabled and remains enabled until the demand drops below the down kilowatt limit setpoint. The down kilowatt demand limit provides control to prevent toggling the end devices on and off repeatedly and too quickly (by way of example, the down kw demand limit setpoint may be ninety percent of the kw demand limit setpoint). Additionally, there is another user input value called tolerance, embodied in a particular implementation by a tolerance table which is stored internally within the apparatus 2. A tolerance value is the number of degrees for a respective zone that the temperature is allowed to be adjusted by demand limiting. In a particular embodiment there is a maximum adjustment of 20° F. beyond which kilowatt demand limit cannot adjust the temperature. The three types of kilowatt demand monitoring are: 1) none (feature is disabled); 2) clocked (a fixed fifteen minute clock interval over which kilowatt demand is averaged, e.g., on the hour, fifteen minutes after the hour, thirty minutes and forty-five minutes after the hour—each for the immediately preceding fifteen minutes); 3) rolled (rolling 15 minute average).

Alarm Code 42

Once a kilowatt demand limit is reached and the demand limiting feature is activated, a variable called "alarm code" begins to increment. Alarm code 42 increments by 1° F. every minute that demand limiting is in effect. Once demand limiting has reduced the current demand below the down kilowatt demand limit, alarm code 42 begins decrementing by 1° F. per minute. To obtain the changed working heating mode setpoint, the value in the alarm code register is subtracted from the value of MEMHTEMP to recalculate the value of HTEMP. The alarm code value is added to MEMTTEMP to recalculate the value of TTEMP for the cooling mode. This is the way that demand limiting is interfaced with the rest of the operating system.

Clock 44

A system clock 44 is used for displaying time and a variety of other events (scheduling and events that are timed). The clock 44 is used in the efficiency control to determine how long programmed items have been running and whether items need to be scheduled for activation.

Program Data Loop 46

The apparatus 2 has a memory area set aside to store timed events. Each event is stored with a time and a set of temperatures. The program data loop examines the clock 44 and when a scheduled event for a zone occurs, the unit will search for the new desired temperatures for that zone and will insert these values into the following four registers: MEMHTEMP, HTEMP, MEMTTEMP and TTEMP. This allows for a temperature set back feature and program changes throughout the day. It is from these base line temperatures that kw demand limiting adjustments are made.

Computed Recovery Loop 48

The computed recovery loop 48 is an enhancement to the program data loop 46. The computed recovery loop 48 uses the historical performance log (described below) to determine how soon to advance the programmed temperature setpoints in order to achieve the desired temperature at the time specified rather than activating the unit then waiting for the building to achieve desired temperature. This way a building can be comfortable when people arrive in the morning, for example.

Historical Performance Log 50

The computed recovery loop 48 reads the historical performance log 50 to determine how long the recovery process will take. Historical performance log 50 stores the following data: the starting temperature, the temperature achieved, the outside temperature and the duration that it took to go from the starting to the desired temperatures. Computed recovery loop 48 uses these values to perform a multi-linear regression analysis to estimate the time it will take to go from the current (starting) temperature to the next desired temperature. In a particular implementation, the loop performs this calculation twice every minute and determines the amount of time remaining between the present time and the next scheduled event. Once the calculated time is the same as the amount of time it will take to go from the current temperature to the scheduled event temperature, the control unit advances the current temperature settings to the next event temperature setpoints. This allows zone temperatures to either increase or decrease to meet desired temperatures at the appropriate time.

Zone Temperature Sensor Input 52

The zone temperature sensor input 52 employs an analog-to-digital converter that uses a table look up to convert the sensor information value to a real temperature reading. The temperature reading is stored in a table that contains current temperatures from all zone sensors. This table is used for determining a zone's ambient temperature. The heater on/off and cool on/off routines 28, 30 use this table to compare against the respective desired temperature. If ambient temperature is greater than the desired temperature in the cool on/off loop, the routine 28 activates the air conditioner; if the ambient temperature is below the desired temperature in the heat on/off loop, the routine 30 activates the heater.

Zone Temperature Setpoint Input 54

Zone temperature setpoint input 54 provides for modifying a selected zone's temperature setpoint via a local unit keypad.

Kilowatt Demand Sensor Input 56

The kilowatt demand sensor input 56 is an analog signal converted in a similar fashion as the temperature data. The input value is compared against the desired demand limit setpoint.

Kilowatt Demand Limit Setpoint Inputs 58

The kilowatt demand limit setpoint is the activation point at which the kilowatt demand loop is activated. There is also the down kilowatt demand limit setpoint input which is the deactivation value for the kilowatt demand loop. There is also the zonal tolerance value which is defined as the maximum temperature adjustment in degrees F allowed in each zone. Also to be entered is the demand limit type (rolled, clocked or none as described above).

Modem Input 60

The modem input 60 is used to adjust all firmware values in a similar fashion as the local keypad, but from a remote site. With the modem system, program data matrix, override data matrix, immediate temperatures in all the zones, unit time, unit date and day of the week can all be modified remotely. The status of the control system can be monitored without having to view the system locally. With the modem (and a computer, such as a personal computer, connected to the modem), the controller can transmit all on/off settings, current zone temperatures, current kilowatt demand, outside temperature and other channel data not displayable from the control panel face plate. The modem allows remote internal diagnostics to be performed for immediate response to problems.

Program Data Matrix 62

The program data matrix 62 is a data array of values for the time and the air conditioning and heating temperature settings and changes. In a particular embodiment, there are four program events per day type and three day types per week, i.e. weekdays (Monday through Friday), Saturday and Sunday, which are programmed separately.

Override

An override input 64 allows a remote request for an override temperature stored in an override data matrix 66 which is similar to the program data matrix 62; but rather than a scheduled event, it is an on demand event. An HTEMP setpoint, a TTEMP setpoint and a duration of the override are stored in the override matrix 66 and are used by an override data loop 68 to replace the then existing HTEMP, TTEMP, MEMTTEMP and MEMTTEMP values when an appropriate override input is received. A programmed time/temperature setpoint change supersedes an "on demand" override.

Demand Side Limit Loop 70

A demand side limit loop 70 performs the same function as the kw demand limit loop 40, except it uses its own tolerance table and responds to a remote alarm code signal 72 received via additional parameters input 20 or modem input 60. This is the function by which a utility can affect the operation of the apparatus 2 when the utility senses excessive demand on its system.

Figure 2:
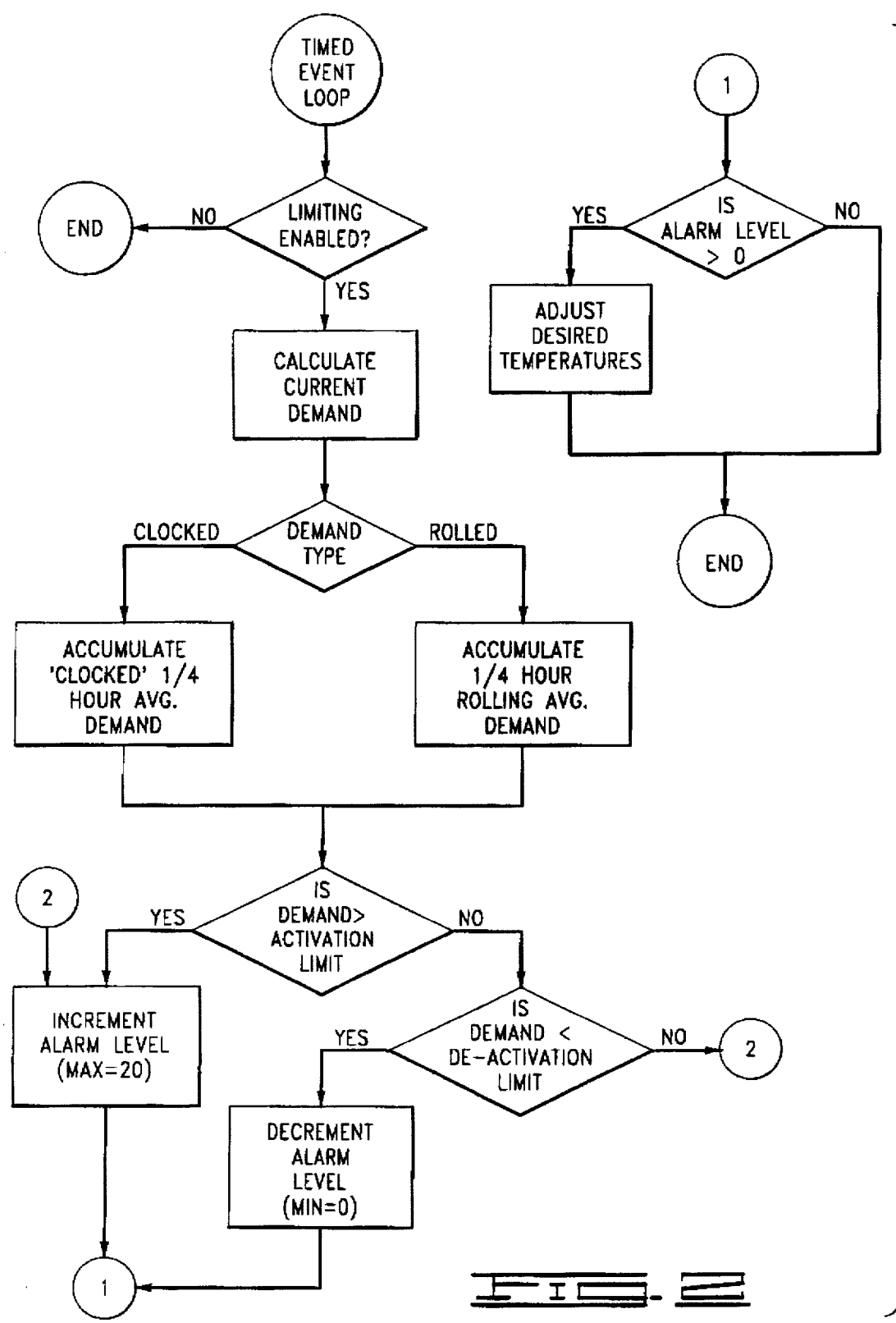
FIG. 2 is a flow chart of the "kw demand limit loop" shown in FIG. 1.
Figure 3:
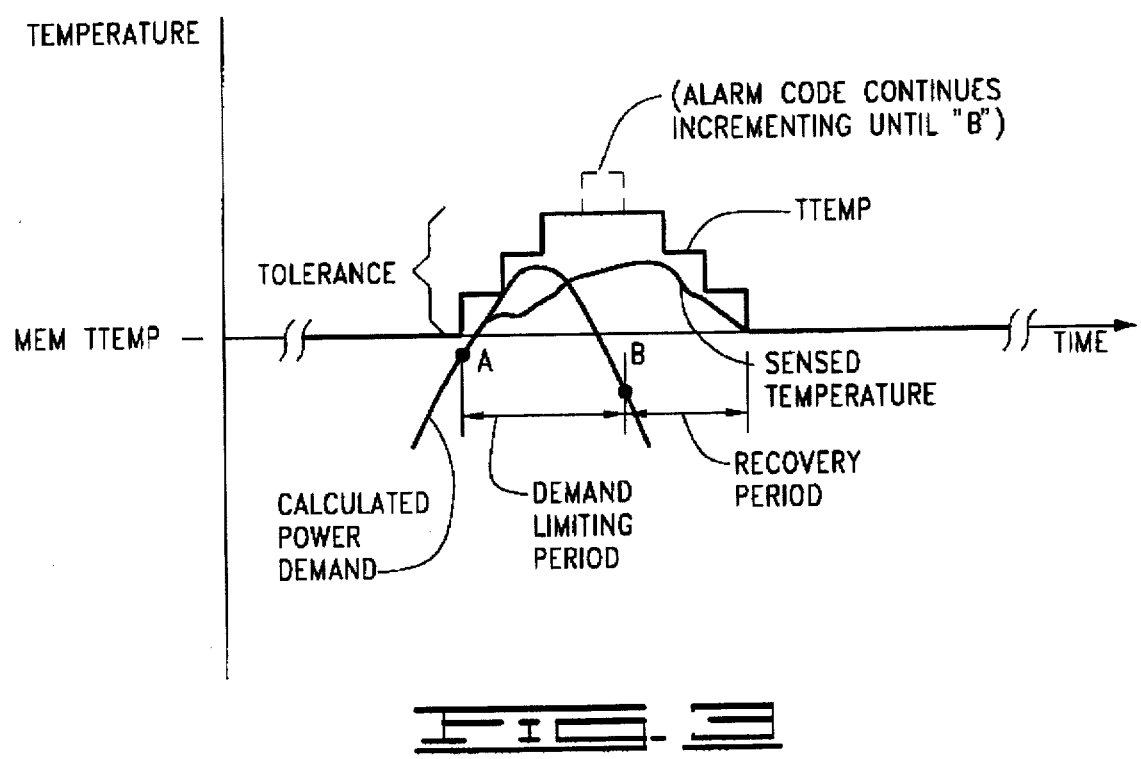
FIG. 3 is a graph illustrating the control provided by the present invention.

Detailed Explanation (FIGS. 2 and 3)

In performing the method and in using the apparatus of the present invention, one or more of the temperature modification devices 4, 6, 8 is controlled by the apparatus 2 to provide a temperature in response to a desired temperature setpoint which can be either locally or remotely entered. This control of the temperature modification device(s) is changed in accordance with the present invention in response to a predetermined power demand limit being exceeded. This limit can be either the locally entered one (i.e., the kw demand limit setpoint) or one maintained at a remote site (e.g., the demand limit used by an electric utility for its grid system); thus, control changes either in response to local power demand (i.e., where the temperature is being controlled) exceeding a predetermined limit or in response to remote power demand (i.e., remote—such as at an electric utility—from where the temperature is being controlled) exceeding a predetermined limit.

With regard to the locally determined kw demand limiting process, changing the temperature control includes controlling the temperature modification device to provide a temperature in response to a modified temperature setpoint. The modified temperature setpoint is the desired temperature setpoint incrementally changed within a predetermined tolerance of the desired temperature setpoint so that power demand is reduced in obtaining a temperature level in response to the modified temperature setpoint. Preferably this temperature modification still obtains a reasonably comfortable temperature. Control ultimately reverts to using the unmodified desired temperature setpoint when the power demand limit is no longer exceeded. This will be further explained with reference to FIG. 2.

FIG. 2 shows the timed event loop implementing the kw demand limit loop 40 shown in FIG. 1. The timed event loop examines the kw demand control input 14 (FIG. 1) to determine if demand limiting is enabled. In a particular implementation, this checking is done at a rate of four times per minute. If demand limiting is enabled, the system cycles through and calculates the current demand from the kw demand sensor input 56.

Once this current local demand is calculated, the system next reviews for either clocked or rolled type of demand. In a particular implementation, clocked demand is an accumulated or clocked quarter hour averaging and is based on four averages each hour at the first, second, third and fourth fifteen minute intervals. Rolled demand is an accumulated quarter hour rolling average for the most recent fifteen minute period.

Once the appropriate kilowatt demand average has been calculated, this average is tested to determine if it exceeds the predetermined kilowatt demand limit as set via the kw demand limit setpoint inputs 58 (FIG. 1). If the present kilowatt demand average exceeds the activation limit, the alarm code register 42 (FIG. 1) begins incrementing on the basis of 1° F. per minute as allowed by a respective tolerance value stored in the tolerance table of the kw demand limit loop 40. The tolerance table contains a maximum temperature offset value, or tolerance, for each zone of the location served by the apparatus 2.

Once the kw demand limit loop 40 is activated, it repeatedly recalculates the kw demand and determines if the calculated demand level is not above the activation limit. If the level is below the deactivation limit (the down kw demand limit setpoint referred to above), the alarm level begins decrementing. If the demand level is between the activation limit and the deactivation limit, the system continues to increment the alarm level.

If a kw demand limit condition exists, the count in the alarm code register 42 is used to adjust the "working" desired temperature setpoint (HTEMP and TTEMP) from the "base" desired temperature setpoint (MEMHTEMP and MEMTTEMP). The air conditioning setpoint temperatures are raised by this amount and the heating setpoint temperatures are lowered by this amount to achieve a reduced kilowatt demand.

If tolerance levels have been achieved and actual calculated kilowatt demand has not declined below the deactivation limit, the zonal tolerance values prevent further modification of the desired temperature setpoints. As a result, a new peak kilowatt demand level will be registered with the utility and the client will be billed at that new level for the next twelve months.

A program for implementing the flow diagram of FIG. 2 and the foregoing method of the present invention is listed at the end of this disclosure.

An example of the foregoing method applied to air conditioning control is illustrated in FIG. 3. The base desired setpoint temperature to be maintained is stored at MEMTTEMP. This value, identified as MEMTTEMP in FIG. 3, is also stored at TTEMP. The value of TTEMP over the time period of the illustrated example is indicated in FIG. 3 by the heavy black line labeled "TTEMP."

Also shown in FIG. 3 is a curve representing the calculated power demand which is determined from the signal received through the kw demand sensor input 56. When this calculated value reaches the kw demand limit setpoint at "A" in FIG. 3, the alarm code register 42 increments; this count is added to the value stored in MEMTTEMP register 38 and the sum is entered in TTEMP register 34. Thus, TTEMP= MEMTTEMP+ ALARM CODE. This new value of TTEMP is then used to operate the air conditioning equipment, which typically results in the actual temperature, sensed via the respective zone temperature sensor input 52, rising as illustrated in FIG. 3 by the "sensed temperature" curve. This continues as described above, with the alarm code and thus TTEMP periodically incrementing toward a tolerance limit, until the calculated kw demand drops below the down kw demand limit setpoint at "B" in FIG. 3. The alarm code, and thus TTEMP, decrement until TTEMP= MEMTTEMP (assuming demand stays below the activating kw demand limit setpoint). The period of time to achieve this is the "recovery period."

The demand side limit process of the preferred embodiment can operate in one of three modes.

A first mode is essentially identical to the methodology used for kw demand limiting as described above. That is, usage of ALARM CODE and a tolerance on a per zone basis are used to dictate TTEMP and HTEMP. The tolerances are defined in the tolerance table for demand side limiting. A particular tolerance is selected by the remote alarm code signal 72 sent from the controller at a remote site.

A second mode is to provide a "grid-wide" manual override of TTEMP or HTEMP (or both) which is to remain in effect until another manual override is sent from the remote site. This later override preferably restores TTEMP/ HTEMP to MEMTTEMP/MEMHTEMP.

A third option is essentially the second option with a timeout. A manual override to TTEMP/HTEMP is sent out, and these are restored to MEMTTEMP/MEMHTEMP after a predetermined length of time, which can be defined in the message string sent from the remote site.

The present invention can be applied to single and multiple zone environments using single or multiple setpoints and tolerances. The present invention can be implemented by any suitable controller means, whether analog or digital and whether programmable or fixed. The preferred embodiment is a programmable microcomputer controller as described above. It can be applied to single or multiple zone control, the latter being obtained the same as for a single zone but simply repeated for each zone and for common or respective setpoint and tolerance values.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

```
/*
    estdmd.c   This routine will check for over load every 15 sec. Calculate
               the accumulated load which is based on the current demand
               from channel 9 sensor Then compare the demand from the
               sensor to the demand limit and if it is greater than the limit
               invoke the alarm condition.
    History:
    Date       By    Comments 11/01/93         original code, RJD and Manjiree Jalukar.
    09/07/94   GV    Corrected logic for checking est. demand flag
*/
include "cheader.h"
static char numIntervals - 0;
static int accumIntrvlDmd - 0;
static int TtempRestored - TRUE;
/*-----------------------------------------------------------------------*
    kwDmd - calc Est Dmd / setAlarmCond / setTtempHtemp
 *-----------------------------------------------------------------------*/
void kwDmd(void)
{
    /* if customer not FIrticipating in */
    if(! (*((char *)&ROLLFLG) == 'R' || *((char *)&ROLLFLG) == 'C') )
    {                                              /* load Ctrl then return*/
        if(!TtempRestored)
        {
            ALARMCODE - 0;
            setTtempHtemp();
            TtempRestored - TRUE;
        }
```

```
            return;
        }
        if(*((char *)&TSEC) != 15 && *((char *)&TSEC)
        != 30 && *((char *)&TSEC) != 45 && *((char *)&TSEC) != 0)
        {
            return;
        }
        calcEstDmd();
        setAlarmCond();
        if(ALARMCODE > 0)
        {
            setTtempHtemp();
            TtempRestored = FALSE;
        }
        return;
}
/*------------------------------------------------------------------*
        getKw -  add a value to KW once every 15secs / divide at end of 15min
                 for a presumed value add DMD1 to DMD2 divide by 2 and put in
                 ESTDMD
 *------------------------------------------------------------------*/
void calcEstDmd(void)
{
static int dmd1 = 0;
static int dmd2 = 0;
int intrvlsLeft;
char dif;
accumIntrvlDmd += (int) *((char *)&KWDATA1);
numIntervals++;
if(*((char *)&KWDATA1) > *((char *)&KWLIMIT) && numIntervals < 60)
        intrvlsLeft = 60 - numIntervals;
        dif = *((char *)&KWDATAI) - *((char *)&KWLIMIT);
        dif += (int)*((char *)&KWDATAl);
        dif = dif > MAX_DMD ? MAX_DMD : dif;
        dmd2 = (accumIntrvlDmd + (intrvlsLeft * dif)) / 60;
        }
else
        {
        dmd2 = accumIntrvlDmd / numIntervals;
        }
*((char *)&ESTDMD) = (char)((dmd1 + dmd2) / 2);
if(((*((char *)&TMIN) == 0   ||
    *((char *)&TMIN) == 15   ||
    *((char *)&TMIN) == 30   ||
    *((char *)&TMIN) == 45   ||
    *((char *)LTMIN) == 60)
    && *((char *)&TSEC) == 0)||numIntervals >= 60)
    {
    if(*((char *)&ROLLFLG) == 'C')
        {
        dmd1 = *((char *)&KWLIMIT);
        }
    else if(*((char *)&ROLLFLG) == 'R')
        {
        dmd1 = dmd2;
        }
    numIntervals = 0;
    accumIntrvlDmd - 0;
    }
*((char *)&LSTDMD) = *((char *)&KWDATA1);
return;
}
/*------------------------------------------------------------------*
    setAlarmCond - ck/set/reset ALARMCOND using count from CONSECUTIVE CNT
 *------------------------------------------------------------------*/
void setAlarmCond(void)
{
if(*((char *)&ESTDMD) > *((char *)&KWLIMIT))
    {
    (*((char *)&INTRVLSUP))++;
    *((char *)&INTRVLSDWN) = 0;
    if(*((char *)&INTRVLSUP) >= CONSECUTIVE_INTRVL_LIMIT)
        {
        if(*((char *)&ALARMCODE) < MAX_TOL)
            {
            (*((char *)&ALARMCODE))++;
            }
        *((char *)&INTRVLSUP) = 0;
        }
    }
```

```
else if(*((char *)&ESTDMD) < *((char *)LKWDWNLIMIT))
    {
    (*((char *)&INTRVLSDWN))++;
    *((char *)&INTRVLSUP) = 0;
    if(*((char *)&INTRVLSDWN) >= CONSECUTIVE_INTRVL_LIMIT)
        {
        if(*((char *)&ALARMCODE) > 0)
            {
            (*((char *)&ALARMCODE))--;
            }
        *((char *)&INTRVLSDWN) = 0;
        /* Changed by Manjiri on 1/4 and it was INTRVLSUP before */
        }
    }
else
    {
    *((char *)&INTRVLSUP) = 0;
    *((char *)&INTRVLSDWN) = 0;
    }
return;
}
/*---------------------------------------------------------------*
    setTtempHtemp - set heat/cool temps
 *---------------------------------------------------------------*/
void setTtempHtemp(void)
{
    char *ptr1, *ptr2, *ptr3, *ptr4, *ptr5;
    char zone, alarmCode;
    alarmCode = *((char *)&ALARMCODE);
    for(zone = 1; zone < 9; zone++)
    {
        switch(zone)
        {
            case 1:
                ptr1 = (char *)&MEMTTEMPA;
                ptr2 = (char *)&MEMHTEMPA;
                ptr3 = (char *)&TTEMPA;
                ptr4 = (char *)&HTEMPA;
                ptr5 = (char *)&TOLERANCEA;
            break;
            case 2:
                ptr1 = (char *)&MEMTTEMPB;
                ptr2 = (char *)&MEMHTEMP;
                ptr3 = (char *)&TTEMPB;
                ptr4 = (char *)&HTEMPB;
                ptr5 = (char *)&TOLERANCEB;
            break;
            case 3:
                ptr1 = (char *)&MEMTTEMPC;
                ptr2 = (char *)&MEMHTEMPC;
                ptr3 = (char *)&TTEMPC;
                ptr4 = (char *)&HTEMPC;
                ptr5 = (char *)&TOLERANCEC;
            break;
            case 4:
                ptr1 = (char *)&MEMTTEMPD;
                ptr2 = (char *)&MEMHTEMPD;
                ptr3 = (char *)&TTEMPD;
                ptr4 = (char *)&HTEMPD;
                ptr5 = (char *)&TOLERANCED;
            break;
            case 5:
                ptr1 = (char *)&MEMTTEMPE;
                ptr2 = (char *)&MEMHTEMPE;
                ptr3 = (char *)&TTEMPE;
                ptr4 = (char *)&HTEMPE;
                ptr5 = (char *)&TOLERANCEE;
            break;
            case 6:
                ptr1 = (char *)&MEMTTEMPF;
                ptr2 = (char *)&MEMHTEMPF;
                ptr3 = (char *)&TTEMPF;
                ptr4 = (char *)&HTEMPF;
                ptr5 = (char *)&TOLERANCEF;
            break;
            case 7:
                ptr1 = (char *)&MEMTTEMPG;
                ptr2 = (char *)&MEMHTEMPG;
                ptr3 = (char *)&TTEMPG;
                ptr4 = (char *)&HTEMPG;
```

-continued

```
                ptr5 = (char *)&TOLERANCEG;
            break;
            case 8:
                ptr1 = (char *)&MEMTTEMPH;
                ptr2 = (char *)&MEMHTEMPH;
                ptr3 = (char *)&TTEMPH;
                ptr4 = (char *)&HTEMPH;
                ptr5 = (char *)&TOLERANCEH;
            break;
        }
        if(*ptr5 > alarmCode)           //IF TOLERANCE > ALARMCODE
        {
            *ptr3 = *ptr1 + alarmCode;  //TTEMP =MEMTTEMP + ALARMCODE
            *ptr4 = *ptr2 - alarmCode;  //HTEMP = MEMHTEMP - ALARMCODE
        }
        else if(*ptr5 > 0)              //IF TOLERANCE > 0
        {
            *ptr3 = *ptr1 + *ptr5;      //TTEMP = MEMTTEMP + TOLERANCE
            *ptr4 = *ptr2 - *ptr5;      //HTEMP = MEMHTEMP - TOLERANCE
        }
        if(  *ptr3 > 89)
            *ptr3 = 89;
        if ( *ptr4 < 53)
            *ptr4 = 53;
    }
    return;
}
```

What is claimed is:

1. A temperature control method, comprising:

controlling a temperature modification device to provide a temperature in response to a desired temperature setpoint; and changing the control of the temperature modification device in response to a predetermined power demand limit being exceeded, including controlling the temperature modification device to provide a temperature in response to a modified temperature setpoint, wherein the modified temperature setpoint is obtained by changing the desired temperature setpoint within a predetermined value of the desired temperature setpoint so that power demand is reduced in obtaining temperature in response to the modified temperature setpoint.

2. A temperature control method as defined in claim 1, further comprising reverting to controlling the temperature modification device to provide a temperature in response to the desired temperature setpoint after the predetermined power demand limit is no longer exceeded.

3. A temperature control method as defined in claim 1, wherein changing the control of the temperature modification device includes monitoring power demand where the temperature is controlled and changing the control in response to the monitored power demand exceeding the predetermined power demand limit.

4. A temperature control method as defined in claim 3, wherein changing the control of the temperature modification device further includes monitoring power demand at an electric utility remote from where the temperature is controlled and changing the control in response to a remote control signal sent from the electric utility to signify that the monitored power demand at the electric utility has exceeded the predetermined power demand limit.

5. A temperature control method as defined in claim 4, further comprising reverting to controlling the temperature modification device to provide a temperature in response to the desired temperature setpoint after the predetermined power demand limit is no longer exceeded.

6. A temperature control method as defined in claim 1, wherein changing the control of the temperature modification device further includes monitoring power demand remotely from where the temperature is controlled and changing the control in response to a remote control signal sent to signify that the remotely monitored power demand has exceeded the predetermined power demand limit.

7. A temperature control method, comprising:

selecting a desired temperature setpoint;

selecting a power demand limit setpoint;

selecting a temperature setpoint tolerance;

monitoring power demand; and controlling temperature in response to an applied temperature setpoint, wherein the applied temperature setpoint is the desired temperature setpoint when the monitored power demand is less than the power demand limit setpoint and wherein the applied temperature setpoint is a temperature within the temperature setpoint tolerance of the desired temperature setpoint when the monitored power demand exceeds the power demand limit setpoint.

8. A temperature control method as defined in claim 7, wherein controlling temperature includes determining the applied temperature setpoint by adding a predetermined increment to the desired temperature setpoint value to define a sum representing a temperature within the temperature setpoint tolerance of the desired temperature setpoint.

9. A temperature control method as defined in claim 8, wherein the step of adding is repeated until the monitored power demand is below the power demand limit setpoint or the temperature setpoint tolerance is reached.

10. A temperature control method as defined in claim 9, wherein the power demand is monitored where the temperature is controlled.

11. A temperature control method as defined in claim 10, wherein the power demand is also monitored remotely from where the temperature is controlled.

12. A temperature control apparatus, comprising:

means for storing a desired temperature setpoint, a power demand limit setpoint and a temperature setpoint tolerance;

means for comparing a sensed power demand with a stored power demand limit setpoint;

means for sensing a temperature;

means for providing a control signal to a temperature modification device in response to whether the compared sensed power demand is less than or greater than the stored power demand limit setpoint, including:

means, responsive both to the compared sensed power demand being less than the stored power demand limit setpoint and to the sensed temperature, for generating the control signal to cause the temperature modification device to make the sensed temperature equal to a stored desired temperature setpoint; and means, responsive both to the compared sensed power demand being greater than the stored power demand limit setpoint and to the sensed temperature, for generating the control signal to cause the temperature modification device to make the sensed temperature equal to the stored desired temperature setpoint plus or minus a predetermined incremental deviation therefrom within a stored temperature setpoint tolerance.

13. A temperature control apparatus as defined in claim 12, further comprising a single housing having all of said means disposed therein.

14. A temperature control apparatus as defined in claim 12, further comprising means for receiving a remote control signal signifying a remotely monitored power demand exceeds a predetermined limit, wherein said means for providing a control signal is also responsive to the remote control signal.

* * * * *

UNITED STATES PATENT AND TRADEMARK OFFICE
CERTIFICATE OF CORRECTION

Patent No.:  5,539,633  Page 1 of 5

Dated:  July 23, 1996

Inventor(s):  Paul N. Hildebrand, Ronald E. Briggs, T. Frank Knight, Manjiree Jalukar, Ralph Dietz, and Kelley A. Lawrence It is certified that errors appear in the above-identified patent and that said Letters Patent is hereby corrected as shown below:

Column 6, line 42, change "perzone" to --per-zone--.

Line 4 of the computer program listing on the page containing columns 11 and 12, after "sensor" insert --.--.

Line 10 of the computer program listing on the page containing columns 11 and 12, change "cheeking" to --checking--.

Line 21 of the computer program listing on the page containing columns 11 and 12, change "Flrticipating" to --participating--.

Line 22 of the computer program listing on the page containing columns 11 and 12, between "ROLLFLG)" and "'R'", change "==" to -- -- -- (the inserted material is a double hyphen).

Line 22 of the computer program listing on the page containing columns 11 and 12, between "ROLLFLG)" and "'C'", change "==" to -- -- -- (the inserted material is a double hyphen).

Line 30 of the computer program listing on the page containing columns 13 and 14, change "numintervals" to --numIntervals--.

UNITED STATES PATENT AND TRADEMARK OFFICE
CERTIFICATE OF CORRECTION

Patent No.: 5,539,633

Dated: July 23, 1996

Inventor(s): Paul N. Hildebrand, Ronald E. Briggs, T. Frank Knight, Manjiree Jalukar, Ralph Dietz, and Kelley A. Lawrence It is certified that errors appear in the above-identified patent and that said Letters Patent is hereby corrected as shown below:

After line 30 of the computer program listing on the page containing columns 13 and 14, insert --{-- on a line by itself (as new line 31).

New line 32 (previously line 31) of the computer program listing on the page containing columns 13 and 14, change "intrvIsLeft" to --intrvlsLeft--.

New line 32 (previously line 31) of the computer program listing on the page containing columns 13 and 14, change "numlntervals" to --numIntervals--.

New line 33 (previously line 32) of the computer program listing on the page containing columns 13 and 14, change "KWDATAI" to --KWDATA1--.

New line 36 (previously line 35) of the computer program listing on the page containing columns 13 and 14, change "intrvIsLeft" to --intrvlsLeft--.

New line 43 (previously line 42) of the computer program listing on the page containing columns 13 and 14, change "==" to -- -- -- (the inserted material is a double hyphen).

UNITED STATES PATENT AND TRADEMARK OFFICE
CERTIFICATE OF CORRECTION

Patent No.:     5,539,633          Page 3 of 5

Dated:           July 23, 1996

Inventor(s):     Paul N. Hildebrand, Ronald E. Briggs, T. Frank Knight, Manjiree Jalukar, Ralph Dietz, and Kelley A. Lawrence It is certified that errors appear in the above-identified patent and that said Letters Patent is hereby corrected as shown below:

New line 44 (previously line 43) of the computer program listing on the page containing columns 13 and 14, change "==" to -- -- -- (the inserted material is a double hyphen).

New line 45 (previously line 44) of the computer program listing on the page containing columns 13 and 14, change "==" to -- -- -- (the inserted material is a double hyphen).

New line 46 (previously line 45) of the computer program listing on the page containing columns 13 and 14, change "==" to -- -- -- (the inserted material is a double hyphen).

New line 47 (previously line 46) of the computer program listing on the page containing columns 13 and 14, change "==" to -- -- -- (the inserted material is a double hyphen).

New line 48 (previously line 47) of the computer program listing on the page containing columns 13 and 14, change "==" to -- -- -- (the inserted material is a double hyphen).

UNITED STATES PATENT AND TRADEMARK OFFICE
CERTIFICATE OF CORRECTION

Patent No.: 5,539,633

Dated: July 23, 1996

Inventor(s): Paul N. Hildebrand, Ronald E. Briggs, T. Frank Knight, Manjiree Jalukar, Ralph Dietz, and Kelley A. Lawrence It is certified that errors appear in the above-identified patent and that said Letters Patent is hereby corrected as shown below:

New line 50 (previously line 49) of the computer program listing on the page containing columns 13 and 14, change "=" to -- -- -- (the inserted material is a double hyphen).

New line 54 (previously line 53) of the computer program listing on the page containing columns 13 and 14, change "=" to -- -- -- (the inserted material is a double hyphen).

New line 59 (previously line 58) of the computer program listing on the page containing columns 13 and 14, change "accumIntrvIDmd" to --accumIntrvlDmd--.

UNITED STATES PATENT AND TRADEMARK OFFICE
CERTIFICATE OF CORRECTION

PATENT NO. : 5,539,633
DATED : July 23, 1996
INVENTOR(S) : Paul N. Hildebrand, Ronald E. Briggs, T. Frank Knight, Manjiree Jalukar, Ralph Dietz, and Kelley A. Lawrence It is certified that error appears in the above-indentified patent and that said Letters Patent is hereby corrected as shown below:

```
Line 9 of the computer program listing on the page
containing columns 15 and 16, change "--" to -- -- --
(the inserted material is a double hyphen).

Line 43 of the computer program listing on the page
containing columns 15 and 16, change "MEMHTEMP" to
--MEMHTEMPB--.
```

Signed and Sealed this

Tenth Day of December, 1996

Attest:

BRUCE LEHMAN

Attesting Officer

Commissioner of Patents and Trademarks